United States Patent  (10) Patent No.: US 8,730,554 B2
Ushigome  (45) Date of Patent: May 20, 2014

(54) VARIABLE TRANSMITTANCE ELEMENT, OPTICAL SYSTEM, AND OPTICAL APPARATUS UTILIZING ELECTROCHROMIC MATERIAL

(71) Applicant: Canon Kabushiki Kaisha, Tokyo (JP)

(72) Inventor: Reona Ushigome, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/649,192

(22) Filed: Oct. 11, 2012

(65) Prior Publication Data

US 2013/0094073 A1 Apr. 18, 2013

(30) Foreign Application Priority Data

Oct. 12, 2011 (JP) .................................. 2011-224767
Aug. 29, 2012 (JP) .................................. 2012-188154

(51) Int. Cl.
*G02F 1/153* (2006.01)
*G02F 1/15* (2006.01)

(52) U.S. Cl.
CPC .................................. *G02F 1/1523* (2013.01)
USPC .......................................... 359/275; 359/265

(58) Field of Classification Search
USPC ................................................. 359/265–275
See application file for complete search history.

(56) References Cited

U.S. PATENT DOCUMENTS 4,465,339 A * 8/1984 Baucke et al. ................ 359/274

FOREIGN PATENT DOCUMENTS

| JP | 06-095165 A | 4/1994 |
|---|---|---|
| JP | 09-152634 A | 6/1997 |
| JP | 2005-077825 A | 3/2005 |

* cited by examiner

*Primary Examiner* — William Choi
(74) *Attorney, Agent, or Firm* — Rossi, Kimms & McDowell LLP (57) ABSTRACT

A variable transmittance element includes two substrates, two transparent electrode layers held between the two substrates, an electrochromic layer held between the two transparent electrode layers and having transmittance that is reversibly changed by electric control, and a first dielectric layer provided between one of the two substrates and one of the two transparent electrode layers closest to the one of the two substrates and configured to reduce reflections. The first dielectric layer is a multilayer film made by alternately laminating two or more layers each having a high refractive index and two or more layers each having a low refractive index, a refractive index difference for a wavelength of 550 nm between the layer having the high refractive index and the layer having the low refractive index being 0.2 or more.

20 Claims, 8 Drawing Sheets

PRIOR ART

FIG. 10

VARIABLE TRANSMITTANCE ELEMENT, OPTICAL SYSTEM, AND OPTICAL APPARATUS UTILIZING ELECTROCHROMIC MATERIAL

BACKGROUND OF THE INVENTION

1. Field of the Invention

The present invention relates to a variable transmittance element, optical system, and optical apparatus utilizing an electrochromic material.

2. Description of the Related Art

Japanese Patent Laid-Open No. ("JP") 6-95165 discloses a structure of a variable transmittance element in which an electrochromic ("EC") layer and an electrolyte layer are laminated between a pair of transparent electrode layers held between a pair of substrates. The variable transmittance element utilizes an EC material which is colored by electric control and has a reversibly changing transmittance. JP 9-152634 proposes to provide an antireflective film on the side of the substrate opposite to the transparent electrode so as to improve the transmittance of the variable transmittance element that uses the EC material.

When each of these variable transmittance elements is used for the image-pickup optical system and the light quantity is adjusted, a deterioration of the imaging performance caused by the diffraction phenomenon of the conventional variable aperture diaphragm is restrained, and the image-pickup optical system becomes smaller because it requires no driver unlike an ND filter and the arrangement limitation reduces. In addition, it has higher transmittance in the decolored state and is less likely to exhibit the polarization dependency than that of a variable transmittance element that utilizes liquid crystal and a polarizer.

JP 2005-77825 proposes to provide an antireflective layer between a substrate and a transparent electrode. The antireflective layer has a refractive index between the reflective indexes of the substrate and the transparent electrode so as to improve the transmittance of a variable transmittance element that uses an EC material.

However, the conventional variable transmittance element that uses the EC material causes interferences among the layers and reflections due to the refractive index differences of the interfaces among the substrate, the transparent electrode, the EC layer, and the electrolyte layer. Hence, the image-pickup optical system utilizing the variable transmittance element has degraded image performance due to insufficient wavelength flatness (color balance) of the transmitted light and the ghosts caused by the high reflectance.

According to JP 2005-77825, a dielectric thin film having a refractive index between 1.75 and 1.95 can reduce reflections between the substrate and the transparent electrode. It is however difficult to restrain reflections caused by interferences between the transparent electrode layer and EC layer and thus is insufficient to improve the wavelength flatness of the transmitted light and to restrain the ghosts. Moreover, it is technically difficult to stably manufacture (mass-produce) the dielectric thin film having a refractive index between 1.75 and 1.95.

SUMMARY OF THE INVENTION

The present invention provides a variable transmittance element, optical system, and optical apparatus utilizing an electrochromic material which can be stably manufactured, and has an improved color balance and reduced ghosts.

A variable transmittance element according to the present invention includes two substrates, two transparent electrode layers held between the two substrates, an electrochromic layer held between the two transparent electrode layers and having transmittance that is reversibly changed by electric control, and a first dielectric layer provided between one of the two substrates and one of the two transparent electrode layers closest to the one of the two substrates and configured to reduce reflections. The first dielectric layer is a multilayer film made by alternately laminating two or more layers each having a high refractive index and two or more layers each having a low refractive index, a refractive index difference for a wavelength of 550 nm between the layer having the high refractive index and the layer having the low refractive index being 0.2 or more.

Further features of the present invention will become apparent from the following description of exemplary embodiments with reference to the attached drawings.

DESCRIPTION OF THE EMBODIMENTS

Referring now to the accompanying drawings, a description will be given of a variety of embodiments of the present invention.

First Embodiment

Figure 1:
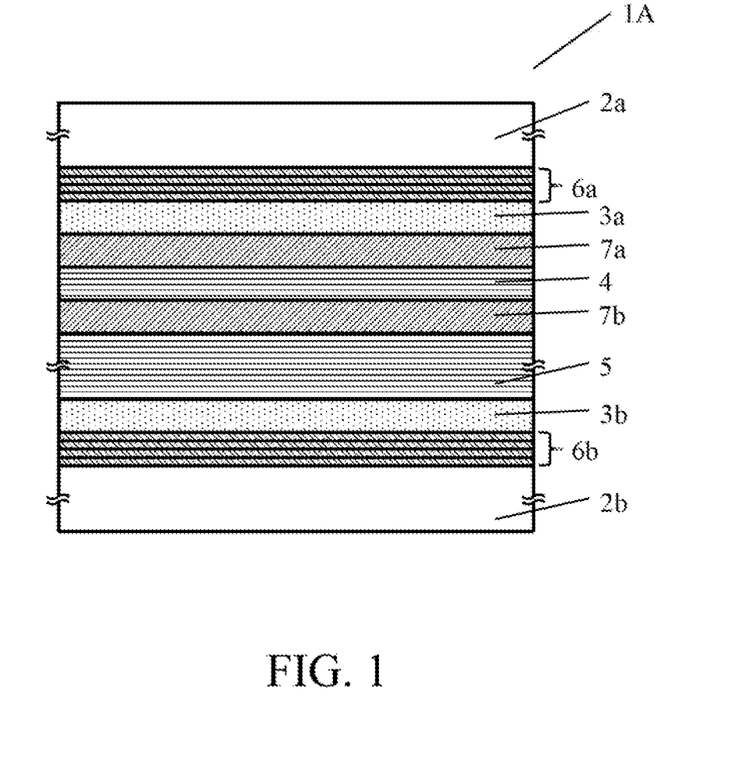
FIG. 1 is a sectional view of a variable transmittance element according to a first embodiment of the present invention.

FIG. 1 is a sectional view of a variable transmittance element 1A according to a first embodiment. The variable transmittance element 1A includes substrates 2a and 2b, transparent electrode layers 3a and 3b, an electrochromic layer (EC layer) 4, an electrolyte layer 5, antireflective ("AR") layers 6a, 6b, 7a, and 7b. In the variable transmittance element 1A, the substrate 2a, the AR layer 6a, the transparent electrode layer 3a, the AR layer 7a, the EC layer 4, the AR layer 7b, the electrolyte layer 5, the transparent electrode layer 3b, the AR layer 6b, and the substrate 2b are arranged in this order from the top.

The substrates 2a and 2b are flat plates or lenses. The two transparent electrode layers 3a and 3b are placed between these two substrates 2a and 2b, and made of ITO. The EC layer 4 has transmittance that is reversibly changed by electric control, is placed between the transparent electrode layers 3a and 3b, and is made of a high-density titanium oxide ($TiO_2$). The electrolyte layer 5 is transparent in a visible range, and is placed between the transparent electrode layers 3a and 3b.

Each of the AR layer 6a placed between the substrate 2a and the transparent electrode layer 3a and the AR layer 6b placed between the substrate 2b and the transparent electrode layer 3b is a first dielectric layer. The first dielectric layer is a multilayer film made by alternately laminating two or more layers each having a high refractive index and two or more layers each having a low refractive index. In this embodiment, each of the AR layers 6a and 6b is a multilayer film in which five $TiO_2$ layers and four $SiO_2$ layers are alternately laminated. The AR layer 6a is provided between the substrate 2a that is one of the two substrates 2a and 2b and the transparent electrode layers 3a nearest the one, and configured to reduce the reflections of the variable transmittance element. The AR layer 6b is provided between the substrate 2b that is the other of the two substrates 2a and 2b and the transparent electrode layers 3b nearest the other. Each of the AR layers 7a and 7b on both sides of the EC layer 4 is a second dielectric layer that is a single layer made of $TiO_2$.

Table 1 shows a material, a refractive index n, an extinction coefficient k, and a film thickness of each layer in the first embodiment. The refractive index of each material means a refractive index for a wavelength of 550 nm.

TABLE 1

| | | n(550 nm) | k(550 nm) | Film Thickness d (nm) | |
|---|---|---|---|---|---|
| Substrate 2a | Glass | 1.52 | 0 | | |
| Antireflective layer 6a | $SiO_2$ | 1.48 | 0 | 222 | |
| | $TiO_2$ | 2.29 | 0 | 5 | |
| | $SiO_2$ | 1.48 | 0 | 80 | |
| | $TiO_2$ | 2.29 | 0 | 13 | |
| | $SiO_2$ | 1.48 | 0 | 44 | |
| Transparent electrode layer 3a | ITO | 1.92 | 0.023 | 100 | |
| Antireflective layer 7a | $TiO_2$ | 2.29 | 0 | 59 | |
| EC layer 4 | High density $TiO_2$ | 2.57 | 0 | 200 | |
| Antireflective layer 7b | $TiO_2$ | 2.29 | 0 | 53 | |
| Electrolyte layer 5 | | 1.48 | 0 | 50000 | (Noninterference layer) |
| Transparent electrode layer 3b | ITO | 1.92 | 0.023 | 100 | |
| Antireflective layer 6b | $TiO_2$ | 2.29 | 0 | 16 | |
| | $SiO_2$ | 1.48 | 0 | 43 | |
| | $TiO_2$ | 2.29 | 0 | 11 | |
| | $SiO_2$ | 1.48 | 0 | 193 | |
| Substrate 2b | Glass | 1.52 | 0 | | |

Figure 2A:
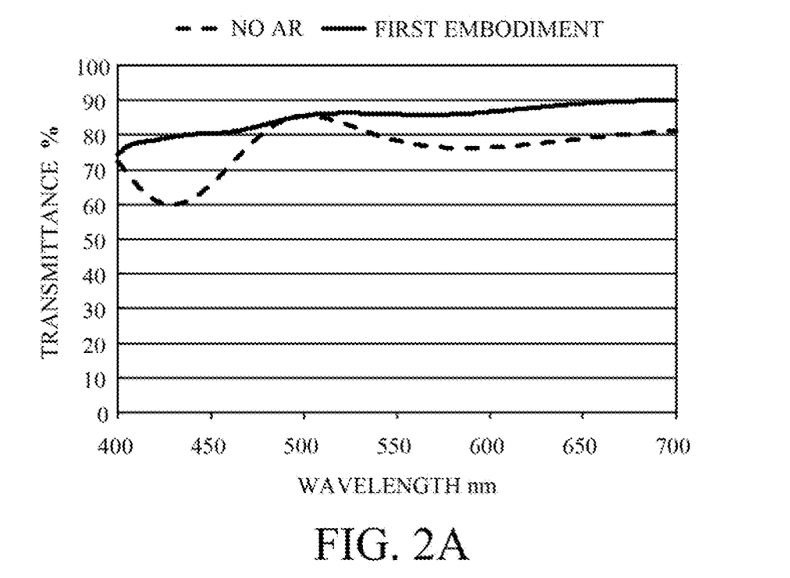
FIGS. 2A and 2B are graphs of the transmittance and reflectance of the variable transmittance element illustrated in FIG. 1 according to the first embodiment.
Figure 10:
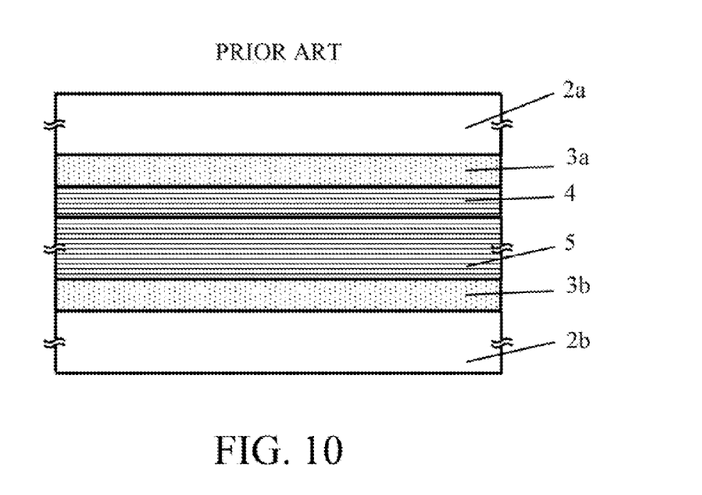
FIG. 10 is a sectional view of a conventional variable transmittance element.

FIG. 2A is a graph of the transmittance of the EC layer 4 in the decolored state in the variable transmittance element 1A according to the first embodiment (solid line) and a graph of the transmittance of the conventional variable transmittance element (broken line) illustrated in FIG. 10 which has no AR layers 6a, 6b, 7a, and 7b. The abscissa axis denotes a wavelength (nm), and the ordinate axis denotes the transmittance (%).

Figure 2B:
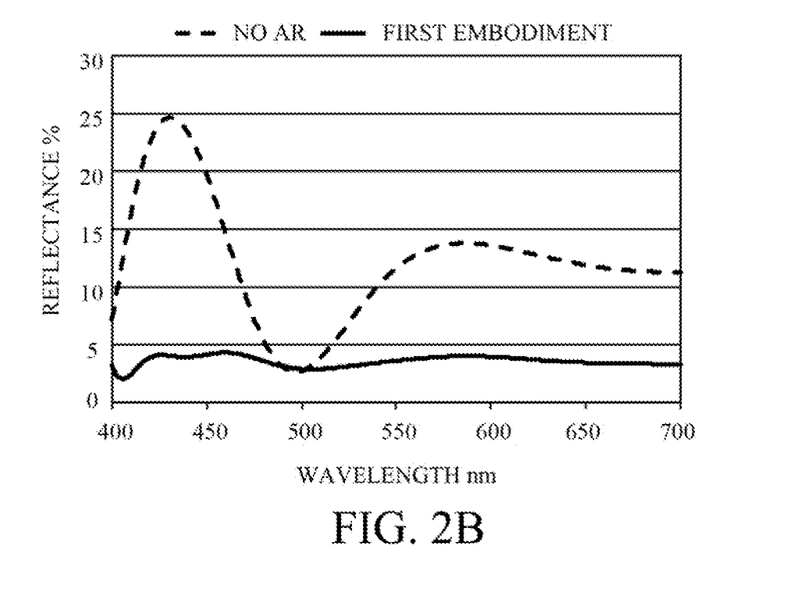

FIG. 2B is a graph of the reflectance of the EC layer 4 in the decolored state of the variable transmittance element 1A (solid line), and a graph of the reflectance of the above conventional variable transmittance element (broken line). The incident angle is set to a perpendicular. The abscissa axis denotes a wavelength (nm), and the ordinate axis denotes the reflectance (%).

The transmittance and reflectance of the first embodiment mean the transmittance and reflectance between the substrates 2a and 2b in the variable transmittance element 1A, and the transmittance and reflectance outside of the substrates 2a and 2b are not considered. This is because the transmittance and reflectance outside of the substrates 2a and 2b are well-known and thus a variety of types of AR functions may be provided. The electrolyte layer 5 is as thick as 50 μm and thus is a noninterference layer that causes no interference.

It is understood from FIG. 2A that the variable transmittance element 1A has better wavelength flatness of the transmittance than that of the conventional example and thus an image-pickup optical system utilizing it provides a better color balance. It is also understood from FIG. 2B that the variable transmittance element 1A has lower reflectance than the conventional example and thus the image-pickup optical system utilizing it can reduce more ghosts. As understood from Table 1, this is because the refractive index differences on the interfaces among the substrates 2a and 2b, the transparent electrode layers 3a and 3b, the EC layer 4, and the electrolyte layer 5 are comparatively large and the interferences of the layers and reflections from the interfaces occur unless the AR layer is provided. In particular, there are many reflections on the interface in which the refractive index difference (difference of the refractive index n in Table 1) for the wavelength 550 nm is 0.3 or higher, and the AR layer may be provided.

The AR layer 6a serves as an AR layer for the substrate 2a and the transparent electrode layer 3a, and the AR layer 6b serves as an AR layer for the substrate 2b and the transparent electrode layer 3b. The AR layer 7a serves as an AR layer for the transparent electrode 3a and the EC layer 4, and the AR layer 7b serves as an AR layer for the EC layer 4 and the electrolyte layer 5. The film thickness of each AR layer is optimized based upon the interferences among all of these layers because the transparent electrode layers 3a and 3b and the EC layer 4 interfere each other as thin films. This configuration is hard to realize in the structure of JP 2005-77825.

The wavelength flatness of the transmittance can be improved and the reflectance can be reduced by an AR layer that is made by laminating transparent dielectric thin films in a visible wavelength band (between 400 and 700 nm) in which a refractive index difference between a high refractive index layer and a low refractive index layer is 0.2 or larger. A dielectric thin film having a large refractive index difference is not indispensable unlike a usual AR layer since the AR layer according to the present invention is provided between the substrate and the transparent electrode layer, and thus a wide range of materials is available for the dielectric thin film. The AR effect improves with materials that provide a refractive index difference of 0.4 or larger.

The layer having the higher refractive index is, for example, titanium oxide ($TiO_2$), tantalic oxide ($Ta_2O_5$), niobium oxide ($Nb_2O_5$), zirconium oxide ($ZrO_2$), hafnium oxide ($HfO_2$), aluminum oxide (alumina) ($Al_2O_3$), and a mixture containing at least one of the above ingredients. The layer having the higher refractive index is made of a material having a refractive index of 1.6 or higher. A material having a refractive index of 2.0 or higher provides a more AR effect. The refractive index is measured with a wavelength of 550 nm.

The layer having a lower refractive index is, for example, silicon oxide ($SiO_2$), magnesium fluoride ($MgF_2$), aluminum oxide ($Al_2O_3$), and a mixture containing at least one of the above ingredients. The layer having the lower refractive index can use a material having a refractive index of 1.7 or lower. A material having a refractive index of 1.5 or lower provides a more AR effect.

While the film thickness is properly selectable according to the refractive indexes and the film thicknesses of the substrate, the transparent electrode layer, and the EC layer, it can be ranged between 5 nm and 500 nm. The number of layers is arbitrarily adjustable as long as there are two or more layers.

The AR effect is improved by making the layer having the higher refractive index physically thinner than the neighboring layer having the lower refractive index.

Since each of the AR layers 6a and 6b is made of a dielectric thin film that can be stably manufactured in this embodiment, the variable transmittance element of this embodiment can be stably manufactured (mass-produced).

Each of the transparent electrode layers 3a and 3b contains as a main ingredient a conductive material that is transparent in the visible wavelength band. A material for each of the transparent electrode layers 3a and 3b can be a transparent conductive material, such as indium-doped tin oxide (ITO), fluorine-doped tin oxide (FTO), gallium-doped zinc oxide (GZO), aluminum-doped zinc oxide (AZO), a layer that contains carbon nanotubes, conductive nanoparticles, or metal nanoparticles, a nano-rod, and a nano-wire distributed in a high density.

These materials are transparent but they need to be as thick as 10 nm to 300 nm when applied to an optical system that is required to have a high transmittance as in this embodiment. In particular, when the film thickness exceeds 300 nm, the transmittance becomes lower and an application to the optical system becomes difficult. As the film becomes thinner, the transmittance becomes higher and the electric resistance becomes higher; as the film becomes thicker, the transmittance becomes lower and the electric resistance becomes lower. A proper design can be made using this relationship.

In the variable transmittance element 1A, metal ions and electrons are supplied from the electrolyte layer 5 and the transparent electrode layers 3a and 3b to the EC layer 4 by applying the voltage between the transparent electrode layers 3a and 3b, and thereby the EC layer 4 becomes colored by the chemical change and the transmittance reversibly changes. Thus, there is no restraint of a material for the AR layer located between the substrate and the transparent electrode layer, and a dielectric multilayer can be utilized in which a well-known high refractive index thin film and a well-known low refractive index thin film are alternately laminated. On the other hand, an AR layer needs to be conductive to some extent for a space between the transparent electrode layers in which metal ions and electrons move or diffuse.

Unless the electrical resistance of the entire AR layer between the transparent electrode layers is 100Ω or smaller per 1 $cm^2$ area in the film thickness direction, metal ions and electrons are prevented from moving, the response delays, and the variable transparent element 1A becomes hard to work. Thus, each of the AR layers 7a and 7b between the transparent electrode layers may satisfy the following expressions:

$$0 < \Sigma_i \rho_i d_i \leq 100 \ \Omega cm^2 \quad (1)$$

Herein, $\rho_i$ denotes the electric resistivity [Ωcm] of an i-th AR layer between the transparent electrode layers, and di denotes the film thickness [cm] of the i-th AR layer. Since $TiO_2$ used for the AR layers 7a and 7b in the first embodiment has the electric resistivity of $5 \times 10^6$ Ωcm, the electrical resistance of the first embodiment becomes 56 $\Omega cm^2$ and satisfies Expression 1.

Since the electric resistivity of $TiO_2$ in the AR layer is likely to vary due to the doping and the manufacturing process, it may be arbitrarily adjusted according to the film thickness and the manufacturing process. It is difficult to use $SiO_2$ and $MgF_2$ known as a low refractive index film for the AR film because they are highly insulating materials.

Although each of the EC layer 4 and the AR layers 7a, and 7b is made of the same material as $TiO_2$ in the first embodiment, the present invention is not limited to this embodiment and different materials are usable. Although each of the AR layers 7a and 7b is a single layer film, a multilayer film may be used as long as Expression 1 is satisfied.

When each of the AR layers 7a and 7b is a single layer, its refractive index for the wavelength of 550 nm may lie between the refractive indexes for the wavelength of 550 nm of the layers on both sides of each of the AR layers 7a and 7b. For example, the AR layer 7a has a refractive index of 2.29 for the wavelength of 550 nm in this embodiment, which is between the refractive indexes of 1.92 and 2.57 for the wavelength of 550 nm of the transparent electrode layer 3a and the EC layer 4 on both sides of the AR layer 7a. The AR layer 7b has a refractive index of 2.29 for the wavelength of 550 nm, which is between the refractive indexes 2.57 and 1.48 for the wavelength of 550 nm of the EC layer 4 and the electrolyte layer 5 on both sides of the AR layer 7b. While the AR layers 7a and 7b between the transparent electrodes 3a and 3b exhibit AR functions when their refractive indexes, film thicknesses, and design wavelength satisfy that nd/λ is (2i+1)/4 (i=0, 1, 2, . . . ), the following expression may be satisfied when the EC material is particularly used as in this embodiment.

$$1/6 < nd/\lambda_0 < 1/3 \quad (2)$$

Herein, n denotes a refractive index for a wavelength $\lambda_0$, d denotes a film thickness of the AR layer, and $\lambda_0$, which is 550 nm, denotes a design wavelength in the visible wavelength band (400-700 nm). When Expression 2 is satisfied, the film becomes thin, the electrical resistance of the variable transmittance element 1A becomes low, and the response becomes faster. The AR layer 7a has nd/$\lambda_0$ of 0.25 and the AR layer 7b has nd/$\lambda_0$ of 0.22 in the first embodiment, and thus Expression 2 is satisfied. Since each of the EC layer 4 and the AR layers 7a and 7b is made of the same material of $TiO_2$ in the first embodiment, each of them serves as the EC layer as well as the AR layer.

The transmittance of the variable transmittance element 1A may satisfy the following expression:

$$0.9 < T(\lambda_v \pm 20 \ nm)/T(\lambda_v) < 1.1 \quad (3)$$

Herein, $T(\lambda_v)$ denotes the transmittance for the wavelength $\lambda_v$, and $\lambda_v$ is an arbitrary wavelength contained in the visible wavelength band between 420 and 680 nm. Unless Expression 3 is satisfied, the image-pickup optical system using it exhibits insufficient wavelength flatness of the transmittance and the color imbalance.

The variable transmittance element 1A may have reflectance of 5% or less in a decolored state in the whole visible range and satisfy the following expression:

$$0.5 < R(\lambda_v \pm 20 \ nm)/R(\lambda_v) < 2.0 \quad (4)$$

Herein, $R(\lambda_v)$ denotes the reflectance for the wavelength $\lambda_v$, and $\lambda_v$ is an arbitrary wavelength contained in the visible wavelength band between 420 and 680 nm. Unless Expression 4 is satisfied, the image-pickup optical system using it exhibits high reflectance and causes ghosts with a strong and conspicuous tint.

Table 2 summarizes numerical values of Expressions 3 and 4 of the first embodiment. It is understood from Table 2 that Expressions 3 and 4 are satisfied.

TABLE 2

| | Expression 3 | | | | Expression 4 | | | |
|---|---|---|---|---|---|---|---|---|
| | $T(\lambda v + 20\,nm)/T(\lambda v)$ | | $T(\lambda v - 20\,nm)/T(\lambda v)$ | | $R(\lambda v + 20\,nm)/R(\lambda v)$ | | $R(\lambda v - 20\,nm)/R(\lambda v)$ | |
| Wavelength | First Embodiment | No AR | First Embodiment | No AR | First Embodiment | No AR | First Embodiment | No AR |
| 420 | 1.021 | 1.011 | 0.949 | 1.186 | 1.009 | 1.032 | 0.818 | 0.319 |
| 430 | 1.011 | 1.097 | 0.977 | 1.093 | 1.026 | 0.796 | 0.614 | 0.670 |
| 440 | 1.008 | 1.152 | 0.979 | 0.989 | 1.096 | 0.625 | 0.991 | 0.969 |
| 450 | 1.018 | 1.167 | 0.989 | 0.911 | 0.981 | 0.480 | 0.974 | 1.256 |
| 460 | 1.029 | 1.145 | 0.992 | 0.868 | 0.831 | 0.365 | 0.913 | 1.601 |
| 470 | 1.033 | 1.100 | 0.983 | 0.857 | 0.767 | 0.325 | 1.019 | 2.085 |
| 480 | 1.028 | 1.050 | 0.972 | 0.873 | 0.809 | 0.517 | 1.204 | 2.743 |
| 490 | 1.018 | 1.006 | 0.968 | 0.909 | 0.927 | 1.281 | 1.305 | 3.078 |
| 500 | 1.009 | 0.977 | 0.973 | 0.953 | 1.048 | 2.144 | 1.236 | 1.935 |
| 510 | 1.002 | 0.961 | 0.982 | 0.994 | 1.112 | 2.056 | 1.079 | 0.781 |
| 520 | 0.998 | 0.957 | 0.991 | 1.024 | 1.126 | 1.703 | 0.954 | 0.466 |
| 530 | 0.996 | 0.960 | 0.998 | 1.041 | 1.119 | 1.440 | 0.899 | 0.486 |
| 540 | 0.997 | 0.967 | 1.002 | 1.045 | 1.104 | 1.269 | 0.888 | 0.587 |
| 550 | 0.999 | 0.977 | 1.004 | 1.042 | 1.084 | 1.156 | 0.894 | 0.694 |
| 560 | 1.001 | 0.986 | 1.003 | 1.034 | 1.057 | 1.080 | 0.906 | 0.788 |
| 570 | 1.005 | 0.995 | 1.001 | 1.024 | 1.025 | 1.027 | 0.923 | 0.865 |
| 580 | 1.008 | 1.002 | 0.999 | 1.014 | 0.992 | 0.990 | 0.946 | 0.926 |
| 590 | 1.010 | 1.007 | 0.995 | 1.005 | 0.964 | 0.966 | 0.976 | 0.974 |
| 600 | 1.012 | 1.011 | 0.992 | 0.998 | 0.946 | 0.951 | 1.008 | 1.010 |
| 610 | 1.012 | 1.014 | 0.990 | 0.993 | 0.937 | 0.944 | 1.037 | 1.035 |
| 620 | 1.012 | 1.015 | 0.988 | 0.989 | 0.940 | 0.943 | 1.058 | 1.051 |
| 630 | 1.010 | 1.015 | 0.988 | 0.987 | 0.951 | 0.947 | 1.067 | 1.059 |
| 640 | 1.008 | 1.014 | 0.989 | 0.986 | 0.965 | 0.955 | 1.064 | 1.060 |
| 650 | 1.006 | 1.013 | 0.990 | 0.986 | 0.978 | 0.965 | 1.052 | 1.055 |
| 660 | 1.005 | 1.012 | 0.992 | 0.986 | 0.986 | 0.975 | 1.037 | 1.047 |
| 670 | 1.003 | 1.010 | 0.994 | 0.987 | 0.989 | 0.985 | 1.023 | 1.037 |
| 680 | 1.002 | 1.009 | 0.995 | 0.988 | 0.987 | 0.992 | 1.014 | 1.026 |

The variable transmittance element 1A includes the AR layers 6a and 6b as dielectric multilayer layers made by laminating the high refractive index films and the low refractive index films between the substrate 2a and the transparent electrode layer 3a and between the substrate 2b and the transparent electrode layer 3b, and the conductive AR layers 7a and 7b between the transparent electrode layers 3a and 3b. As a result, the variable transmittance element 1A can be stably manufactured, improve the color balance, and reduce ghosts.

Second Embodiment

Figure 3:
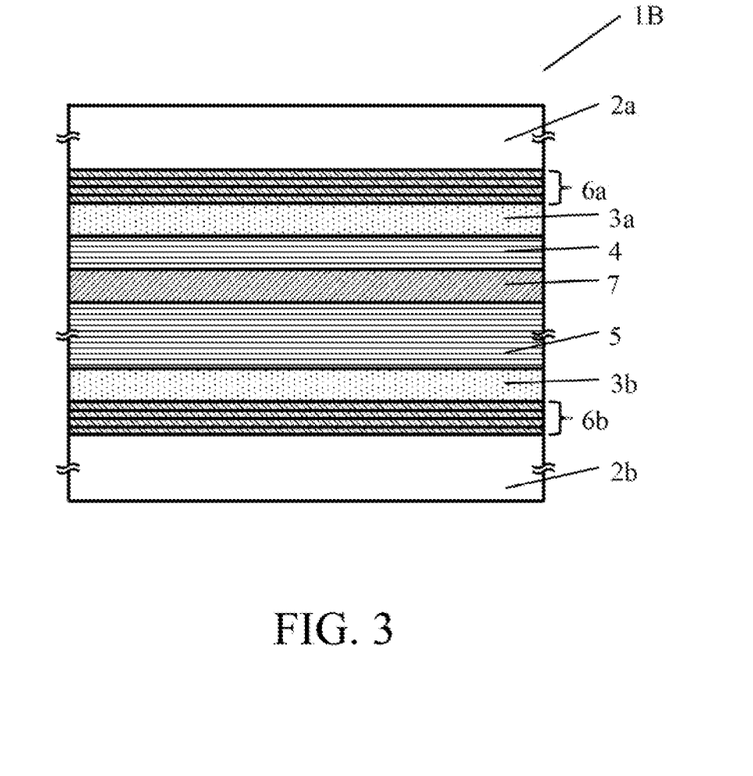
FIG. 3 is a sectional view of a variable transmittance element according to a second embodiment of the present invention.

FIG. 3 is a sectional view of a variable transmittance element 1B according to a second embodiment. The second embodiment is different from the first embodiment in that each of the transparent electrode layers 3a and 3b is as thin as 20 nm, there is no AR film 7a between the transparent electrode layer 3a and the EC layer 4 and the AR layer 7 of a single layer made of TiO₂ is provided between the EC layer 4 and the electrolyte layer 5. Moreover, each of the AR layers 6a and 6b is a multilayer film in which four TiO₂ layers and three SiO₂ layers are alternately laminated in the second embodiment, and thus the number of layers of this embodiment is smaller than that of the first embodiment.

Table 3 shows a material, a refractive index n, an extinction coefficient k, and a film thickness of each layer in the second embodiment. The refractive index of each material means a refractive index for a wavelength of 550 nm.

TABLE 3

| | | n(550 nm) | k(550 nm) | Film Thickness d (nm) | |
|---|---|---|---|---|---|
| Substrate 2a | Glass | 1.52 | 0 | | |
| Antireflective layer 6a | SiO₂ | 1.48 | 0 | 214 | |
| | TiO₂ | 2.29 | 0 | 11 | |
| | SiO₂ | 1.48 | 0 | 43 | |
| | TiO₂ | 2.29 | 0 | 32 | |
| Transparent electrode layer 3a | ITO | 1.92 | 0.023 | 20 | |
| EC layer 4 | High density TiO₂ | 2.57 | 0 | 200 | |
| Antireflective layer 7 | TiO₂ | 2.29 | 0 | 51 | |
| Electrolyte layer 5 | | 1.48 | 0 | 50000 | (Noninterference layer) |
| Transparent electrode layer 3b | ITO | 1.92 | 0.023 | 20 | |
| Antireflective | SiO₂ | 1.48 | 0 | 58 | |

TABLE 3-continued

|  |  | n(550 nm) | k(550 nm) | Film Thickness d (nm) |
|---|---|---|---|---|
| layer 6b | TiO$_2$ | 2.29 | 0 | 8 |
|  | SiO$_2$ | 1.48 | 0 | 194 |
| Substrate 2b | Glass | 1.52 | 0 |  |

Similar to FIGS. 2A and 2B, FIGS. 4A and 4B illustrate the transmittance and reflectance of the EC layer in the decolored state in each of the variable transmittance element 1B of the second embodiment and the conventional example.

Figure 4A:
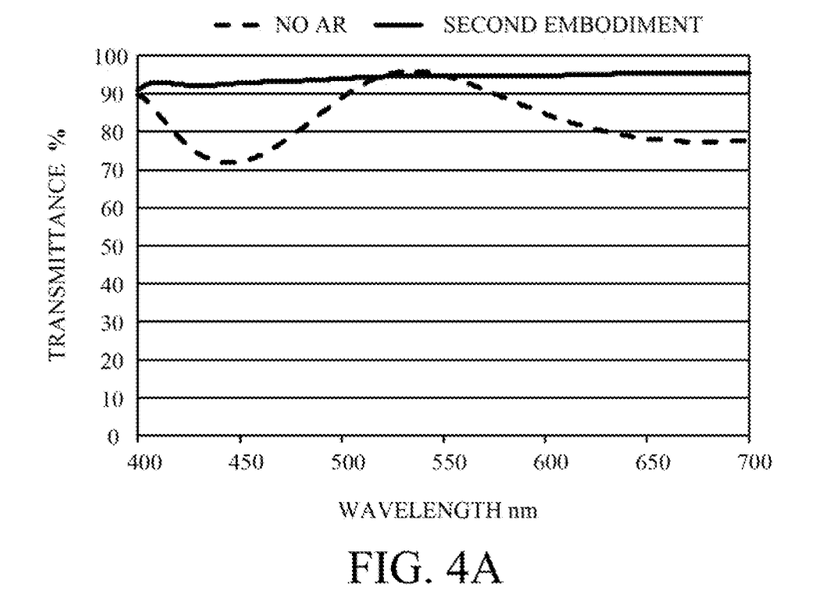
FIGS. 4A and 4B are graphs of the transmittance and reflectance of the variable transmittance element illustrated in FIG. 3 according to the second embodiment.
Figure 4B:
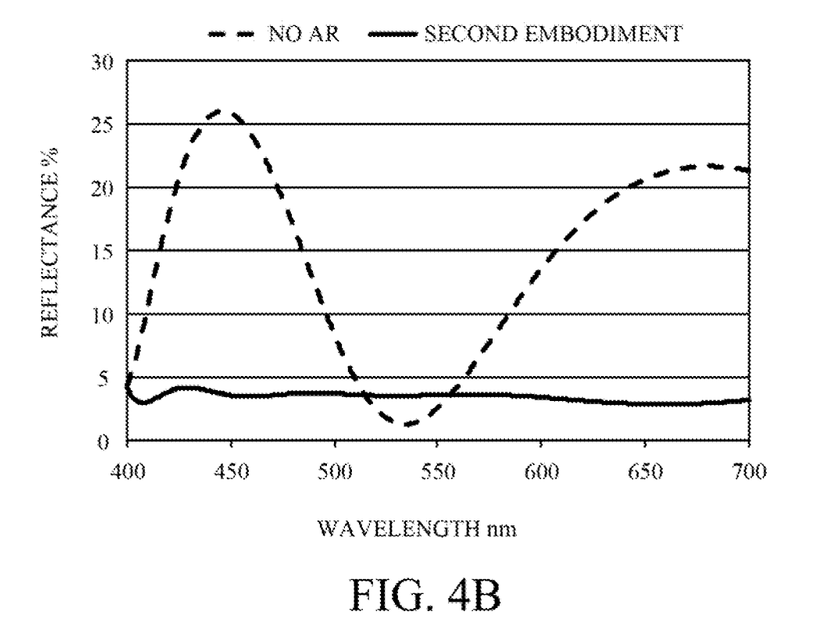

It is understood from FIGS. 4A and 4B that the wavelength flatness of the transmittance improves and the reflectance reduces similar to the first embodiment. Moreover, the transparent electrode layer is thin and the transmittance improves.

Since the transparent electrode layer is thinner than that of the first embodiment, the AR layer 6a and the transparent electrode layer 3a serve as AR layers for the substrate 2a and the EC layer 4, and the AR layer 6b and the transparent electrode layer 3b serve as AR layers for the substrate 2b and the electrolyte layer 5. The AR layer 7 serves as an AR layer for the EC layer 4 and the electrolyte layer 5. A film thickness of each AR layer is optimized in consideration of the interferences among all layers. The AR layer can improve the wavelength flatness of the transmittance, and reduce the reflectance as in the first embodiment.

The AR layer 7 of the second embodiment has electrical resistance of 25.5 Ωcm$^2$, and satisfies Expression 1. In addition, nd/λ$_0$ is 0.21, and satisfies Expression 2. Table 4 summarizes numerical values of Expressions 3 and 4 of the second embodiment. The second embodiment satisfies both Expressions 3 and 4 in light of Table 4.

The differently structured, variable transmittance element 1B can also exhibit effects similar to those of the first embodiment. While this embodiment uses the transparent electrode layer thinner than that of the first embodiment, a film thickness and a material of another layer may be changed from those of the first embodiment.

Third Embodiment

Figure 5:
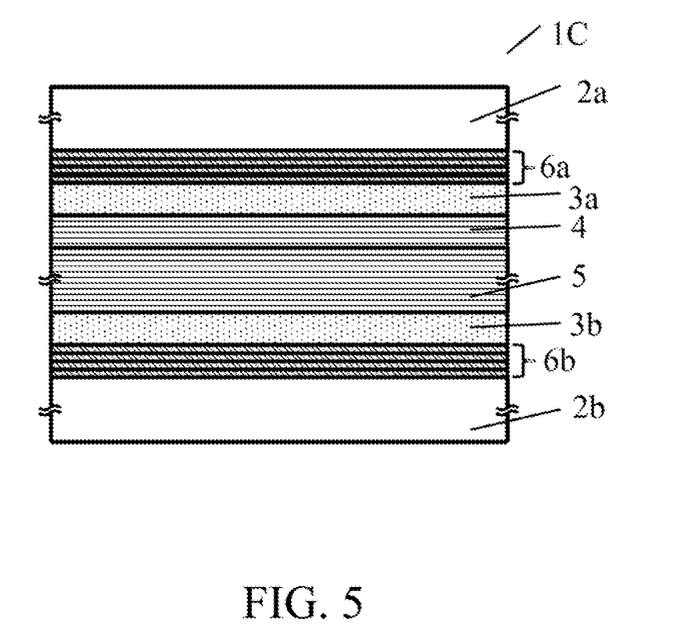
FIG. 5 is a sectional view of a variable transmittance element according to a third embodiment of the present invention.

FIG. 5 is a sectional view of a variable transmittance element 1C according to a third embodiment. The third embodiment uses an organic EC layer that is different from the EC layers in the first and second embodiment, and the variable transmittance element 1C includes none of the AR layers 7, 7a and 7b as single layers of the first and second embodiments. Each of the AR layers 6a and 6b of the third embodiment is a multilayer film in which four TiO$_2$ layers and four SiO$_2$ layers are alternately laminated.

Table 5 shows a material, a refractive index n, an extinction coefficient k, and a film thickness of each layer in the variable transmittance element 1C. The refractive index of each material means a refractive index for a wavelength of 550 nm.

TABLE 5

|  |  | n(550 nm) | k(550 nm) | Film Thickness d (nm) |
|---|---|---|---|---|
| Substrate 2a | Glass | 1.52 | 0 |  |
| Antireflective | SiO$_2$ | 1.48 | 0 | 218 |
| layer 6a | TiO$_2$ | 2.29 | 0 | 10 |
|  | SiO$_2$ | 1.48 | 0 | 42 |
|  | TiO$_2$ | 2.29 | 0 | 14 |

TABLE 4

| | Expression 3 | | | | Expression 4 | | | |
|---|---|---|---|---|---|---|---|---|
| | T(λv + 20 nm)/T(λv) | | T(λv − 20 nm)/T(λv) | | R(λv + 20 nm)/R(λv) | | R(λv − 20 nm)/R(λv) | |
| Wavelength | Second Embodiment | No AR | Second Embodiment | No AR | Second Embodiment | No AR | Second Embodiment | No AR |
| 420 | 0.999 | 0.919 | 0.986 | 1.146 | 1.006 | 1.428 | 1.059 | 0.245 |
| 430 | 1.007 | 0.973 | 1.009 | 1.140 | 0.849 | 1.119 | 0.725 | 0.468 |
| 440 | 1.007 | 1.025 | 1.001 | 1.088 | 0.889 | 0.940 | 0.994 | 0.700 |
| 450 | 1.005 | 1.067 | 0.993 | 1.028 | 1.005 | 0.812 | 1.179 | 0.894 |
| 460 | 1.004 | 1.094 | 0.993 | 0.975 | 1.068 | 0.701 | 1.124 | 1.063 |
| 470 | 1.005 | 1.105 | 0.995 | 0.937 | 1.050 | 0.596 | 0.996 | 1.232 |
| 480 | 1.006 | 1.102 | 0.996 | 0.914 | 1.001 | 0.491 | 0.936 | 1.426 |
| 490 | 1.006 | 1.086 | 0.995 | 0.905 | 0.966 | 0.387 | 0.953 | 1.677 |
| 500 | 1.005 | 1.063 | 0.994 | 0.908 | 0.959 | 0.298 | 0.999 | 2.036 |
| 510 | 1.003 | 1.037 | 0.994 | 0.921 | 0.975 | 0.284 | 1.035 | 2.583 |
| 520 | 1.001 | 1.012 | 0.995 | 0.941 | 1.000 | 0.598 | 1.043 | 3.354 |
| 530 | 1.000 | 0.990 | 0.997 | 0.964 | 1.018 | 1.880 | 1.026 | 3.523 |
| 540 | 0.999 | 0.973 | 0.999 | 0.989 | 1.022 | 2.969 | 1.000 | 1.673 |
| 550 | 0.999 | 0.961 | 1.000 | 1.010 | 1.011 | 2.561 | 0.982 | 0.532 |
| 560 | 1.000 | 0.955 | 1.001 | 1.028 | 0.991 | 2.049 | 0.978 | 0.337 |
| 570 | 1.001 | 0.952 | 1.001 | 1.040 | 0.968 | 1.718 | 0.989 | 0.390 |
| 580 | 1.002 | 0.953 | 1.000 | 1.048 | 0.946 | 1.508 | 1.009 | 0.488 |
| 590 | 1.003 | 0.955 | 0.999 | 1.050 | 0.931 | 1.368 | 1.033 | 0.582 |
| 600 | 1.003 | 0.960 | 0.998 | 1.050 | 0.923 | 1.271 | 1.057 | 0.663 |
| 610 | 1.003 | 0.965 | 0.997 | 1.047 | 0.924 | 1.200 | 1.074 | 0.731 |
| 620 | 1.003 | 0.971 | 0.997 | 1.042 | 0.933 | 1.147 | 1.083 | 0.787 |
| 630 | 1.003 | 0.978 | 0.997 | 1.036 | 0.950 | 1.105 | 1.083 | 0.833 |
| 640 | 1.002 | 0.984 | 0.997 | 1.029 | 0.974 | 1.072 | 1.072 | 0.872 |
| 650 | 1.001 | 0.990 | 0.998 | 1.023 | 1.001 | 1.045 | 1.052 | 0.905 |
| 660 | 1.000 | 0.995 | 0.998 | 1.017 | 1.029 | 1.022 | 1.027 | 0.933 |
| 670 | 1.000 | 1.000 | 0.999 | 1.010 | 1.057 | 1.002 | 0.999 | 0.957 |
| 680 | 0.999 | 1.005 | 1.000 | 1.005 | 1.081 | 0.984 | 0.971 | 0.979 |

TABLE 5-continued

| | | n(550 nm) | k(550 nm) | Film Thickness d (nm) | |
|---|---|---|---|---|---|
| Transparent electrode layer 3a | ITO | 1.92 | 0.023 | 100 | |
| EC layer 4 | Organic EC layer | 1.59 | 0 | 500 | |
| Electrolyte layer 5 | | 1.48 | 0 | 50000 | (Noninterference layer) |
| Transparent electrode layer 3b | ITO | 1.92 | 0.023 | 100 | |
| Antireflective layer 6b | TiO$_2$ | 2.29 | 0 | 16 | |
| | SiO$_2$ | 1.48 | 0 | 43 | |
| | TiO$_2$ | 2.29 | 0 | 11 | |
| | SiO$_2$ | 1.48 | 0 | 193 | |
| Substrate 2b | Glass | 1.52 | 0 | | |

Similar to FIGS. 2A, 2B, 4A, and 4B, FIGS. 6A and 6B illustrate the transmittance and reflectance of the EC layer in the decolored state in the variable transmittance element 1C.

Figure 6A:
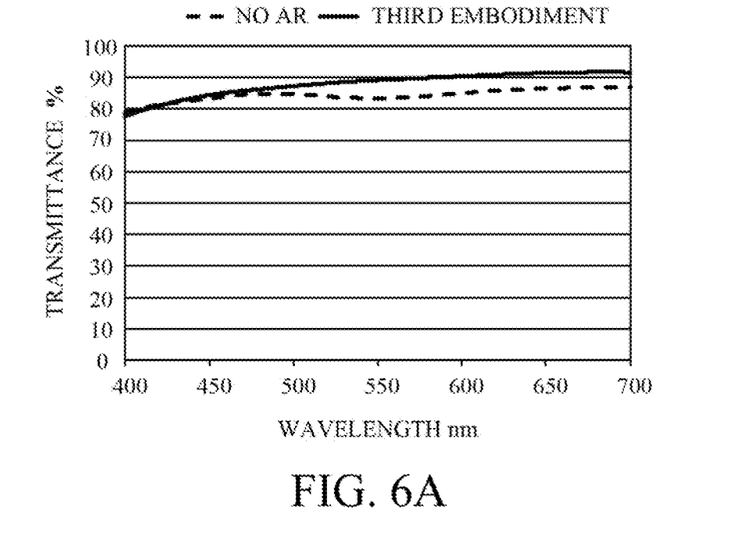
FIGS. 6A and 6B are graphs of the transmittance and reflectance of the variable transmittance element illustrated in FIG. 5 according to the third embodiment.
Figure 6B:
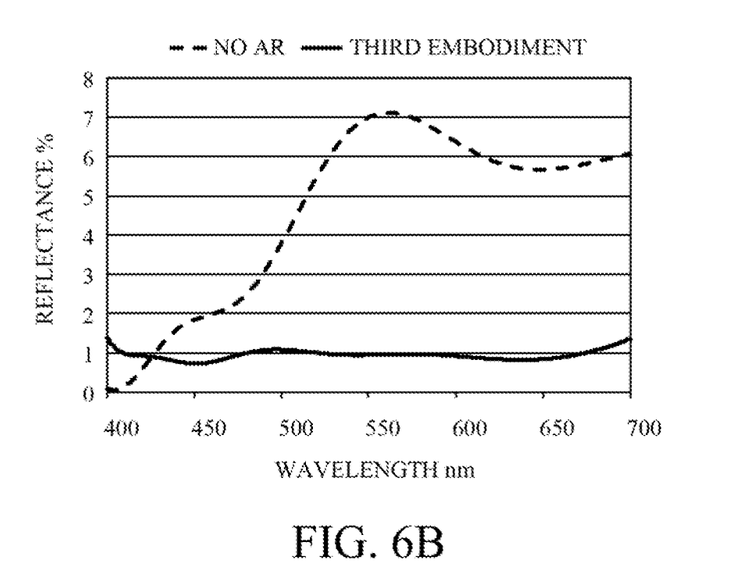

It is understood from FIGS. 6A and 6B that the wavelength flatness of the transmittance improves and the reflectance reduces in the variable transmittance element 1C similar to the first and second embodiments.

Since the EC layer of this embodiment has a refractive index lower than that of the first and second embodiment, the AR layer 6a, the transparent electrode layer 3a, and the EC layer 4 serve as AR layers for the substrate 2a and the electrolyte layer 5, and the AR layer 6b and the transparent electrode layer 3b serve as AR layers for the substrate 2b and the electrolyte layer 5. A film thickness of each antireflective layer is optimized in consideration of the interferences among all layers. The AR layer can improve the wavelength flatness of the transmittance and reduce the reflectance in the transmittance variable element 1C as in the first and second embodiments.

The differently structured, variable transmittance element 1C can also exhibit effects similar to those of the first and second embodiments. While this embodiment uses the EC layer 4 made of a different material from that of the first and second embodiments, a film thickness and a material of another layer may be changed from those of the first embodiment.

Since the variable transmittance element 1C has no AR layer as a single layer, the numerical values of Expressions 1 and 2 do not exist. Table 6 summarizes numerical values of Expressions 3 and 4 for the variable transmittance element 1C. The variable transmittance element 1C satisfies both Expressions 3 and 4 in light of Table 6.

TABLE 6

| | Expression 3 | | | | Expression 4 | | | |
|---|---|---|---|---|---|---|---|---|
| | T(λv + 20 nm)/T(λv) | | T(λv − 20 nm)/T(λv) | | R(λv + 20 nm)/R(λv) | | R(λv − 20 nm)/R(λv) | |
| Wavelength | Third Embodiment | No AR | Third Embodiment | No AR | Third Embodiment | No AR | Third Embodiment | No AR |
| 420 | 1.029 | 1.017 | 0.958 | 0.969 | 0.844 | 2.648 | 1.498 | 0.144 |
| 430 | 1.025 | 1.016 | 0.967 | 0.979 | 0.836 | 1.586 | 1.135 | 0.130 |
| 440 | 1.020 | 1.016 | 0.972 | 0.983 | 0.987 | 1.239 | 1.184 | 0.378 |
| 450 | 1.016 | 1.014 | 0.976 | 0.984 | 1.213 | 1.169 | 1.196 | 0.630 |
| 460 | 1.013 | 1.010 | 0.980 | 0.984 | 1.301 | 1.262 | 1.013 | 0.807 |
| 470 | 1.012 | 1.004 | 0.984 | 0.986 | 1.218 | 1.420 | 0.825 | 0.855 |
| 480 | 1.012 | 0.998 | 0.987 | 0.990 | 1.086 | 1.523 | 0.769 | 0.792 |
| 490 | 1.011 | 0.994 | 0.988 | 0.996 | 0.980 | 1.517 | 0.821 | 0.704 |
| 500 | 1.010 | 0.992 | 0.989 | 1.002 | 0.924 | 1.434 | 0.921 | 0.657 |
| 510 | 1.009 | 0.992 | 0.989 | 1.006 | 0.916 | 1.326 | 1.021 | 0.659 |
| 520 | 1.008 | 0.994 | 0.990 | 1.008 | 0.943 | 1.223 | 1.083 | 0.697 |
| 530 | 1.007 | 0.997 | 0.991 | 1.008 | 0.983 | 1.135 | 1.092 | 0.754 |
| 540 | 1.006 | 1.001 | 0.992 | 1.006 | 1.013 | 1.064 | 1.060 | 0.818 |
| 550 | 1.005 | 1.004 | 0.993 | 1.003 | 1.021 | 1.009 | 1.017 | 0.881 |
| 560 | 1.005 | 1.007 | 0.994 | 0.999 | 1.006 | 0.968 | 0.988 | 0.940 |
| 570 | 1.005 | 1.009 | 0.995 | 0.996 | 0.980 | 0.941 | 0.979 | 0.991 |
| 580 | 1.005 | 1.010 | 0.995 | 0.993 | 0.953 | 0.925 | 0.994 | 1.033 |
| 590 | 1.005 | 1.010 | 0.995 | 0.991 | 0.933 | 0.921 | 1.020 | 1.063 |
| 600 | 1.005 | 1.009 | 0.995 | 0.990 | 0.926 | 0.927 | 1.049 | 1.081 |
| 610 | 1.005 | 1.008 | 0.995 | 0.990 | 0.936 | 0.942 | 1.072 | 1.085 |
| 620 | 1.005 | 1.007 | 0.995 | 0.991 | 0.965 | 0.961 | 1.080 | 1.078 |
| 630 | 1.004 | 1.005 | 0.995 | 0.992 | 1.013 | 0.983 | 1.069 | 1.062 |
| 640 | 1.003 | 1.003 | 0.995 | 0.994 | 1.074 | 1.003 | 1.036 | 1.040 |
| 650 | 1.002 | 1.002 | 0.996 | 0.995 | 1.141 | 1.019 | 0.987 | 1.018 |
| 660 | 1.001 | 1.001 | 0.997 | 0.997 | 1.203 | 1.030 | 0.931 | 0.997 |
| 670 | 1.000 | 1.001 | 0.998 | 0.998 | 1.250 | 1.035 | 0.876 | 0.981 |
| 680 | 1.000 | 1.000 | 0.999 | 0.999 | 1.281 | 1.034 | 0.831 | 0.971 |

The organic EC layer in the variable transmittance element 1C is made of an organic material, which contains an electrochromic site having an electrochromic characteristic and an aromatic ring that is directly combined with the electrochromic site. The electrochromic site forms one conjugate plane, and an atom of the aromatic ring which neighbors an atom united with the electrochromic site may have a substituent having a volume equal to or larger than a methyl group. Since the surrounding site protects the electrochromic site, the compound is likely to endure the oxidation and the durability of the device is high when the compound having high durability to the oxidation is used. The substituent of the aroma ring makes orthogonal the conjugate plane of the electrochromic site to the plane of the surrounding site, and is configured to protect the electrochromic site generated by the radical cation due to the steric hindrance effect. For this purpose, the substituent that has a volume equal to or more than a methyl group may be used.

The organic EC layer in the variable transmittance element 1C may be made by blending a plurality of organic EC materials so as to obtain the wavelength flatness in the colored state, and the AR layer may be properly changed according to the refractive indexes of the blended materials.

Figure 7:
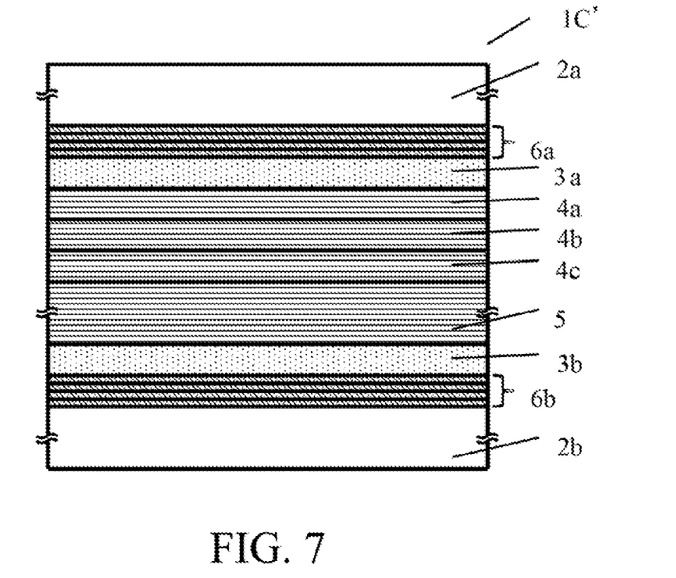
FIG. 7 is a sectional view of another variable transmittance element according to the third embodiment of the present invention.

As in a variable transmittance element 1C' illustrated in FIG. 7, the EC layer 4 may be made by laminating a plurality of different types of layers 4a, 4b, and 4c so as to obtain the wavelength flatness in the colored state. An AR layer may be provided on each interface when the refractive index differences among the materials are large.

Figure 8:
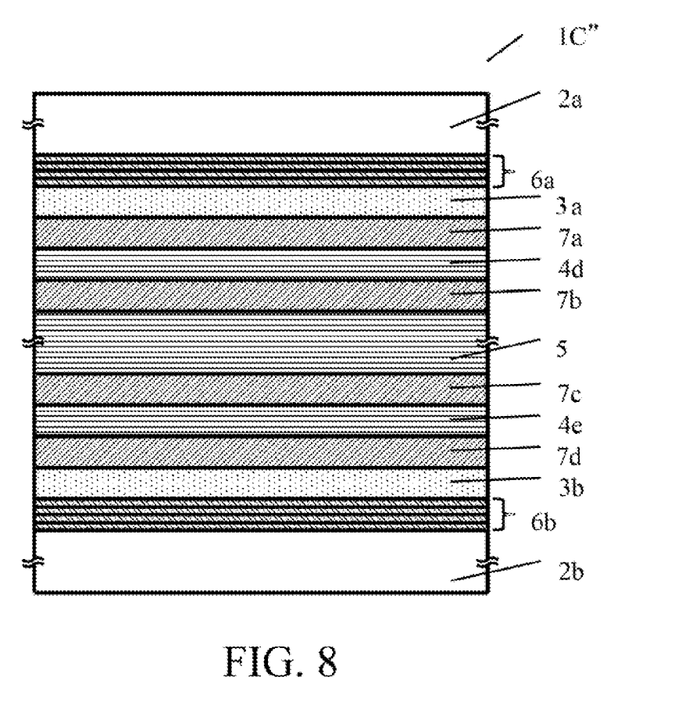
FIG. 8 is a sectional view of still another variable transmittance element according to the third embodiment of the present invention.

A variable transmittance element 1C" illustrated in FIG. 8 includes an oxidative EC layer 4d made, for example, of tungstic oxide ($WO_3$) and a reducing EC layer 4e made, for example, of nickelous oxide (NiO). Since the refractive index differences of the interferences of the EC layers are comparatively large in the variable transmittance element 1C", the AR layers 7a, 7b, 7c, and 7d may be provided similar to the first embodiment.

Thus, the differently structured, variable transmittance elements 1C' and 1C" can also exhibit effects similar to those of the first embodiment.

Fourth Embodiment

Figure 9:
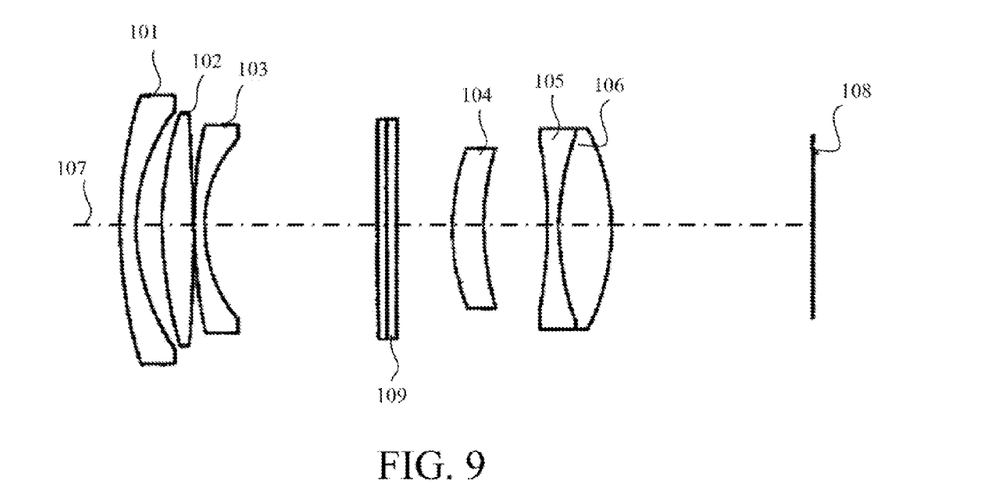
FIG. 9 is a sectional view of a variable transmittance element according to a fourth embodiment of the present invention.

FIG. 9 is a sectional view of an image-pickup optical system such as a camera. Reference numerals 101-106 denote lenses, reference numeral 107 denotes an optical axis, and reference numeral 108 is an imaging plane in which a photoelectrical conversion element such as a film or a CCD is arranged. A variable transmittance element 109 includes one of the variable transmittance elements 1A to 1C", and is electrically connected with a control circuit via an electric signal line (not illustrated). The transmittance of the variable transmittance element 109 is electrically controlled by the control circuit.

The variable transmittance element 109 provides an image-pickup optical system with a good color balance with reduced ghosts. The present invention is not limited to FIG. 9 in which the variable transmittance element is provided on the cementing surface of the flat plate substrate, and it may be provided in the lens surface or lens cementing surface.

The present invention is not limited to the image pickup lens in the camera as in this embodiment, and a similar effect can be obtained even if the present invention is used for a image pickup lens in a video camera, an imaging optical system in an image scanner for an office equipment and a reader lens in a digital copier.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2011-224767, filed on Oct. 12, 2011, and 2012-188154, filed on Aug. 29, 2012, each of which are hereby incorporated by reference herein in their entirety.

What is claimed is:

1. A variable transmittance element comprising:
two substrates;
two transparent electrode layers held between the two substrates;
an electrochromic layer held between the two transparent electrode layers and having transmittance that is reversibly changed by electric control; and
a first dielectric layer provided between one of the two substrates and one of the two transparent electrode layers closest to the one of the two substrates and configured to reduce reflections,
wherein the first dielectric layer is a multilayer film made by alternately laminating two or more layers each having a high refractive index and two or more layers each having a low refractive index, a refractive index difference for a wavelength of 550 nm between the layer having the high refractive index and the layer having the low refractive index being 0.2 or more.

2. The variable transmittance element according to claim 1, wherein another first dielectric layer is located between the other of the two substrates and the other of the two transparent electrode layers closest to the other of the two substrates.

3. The variable transmittance element according to claim 1, wherein the layer having the high refractive index has a refractive index equal to or higher than 1.6.

4. The variable transmittance element according to claim 1, wherein the layer having the low refractive index has a refractive index equal to or lower than 1.7.

5. The variable transmittance element according to claim 1, wherein one of the layers having the high refractive index is physically thinner than a neighboring one of the layers having the low refractive index.

6. The variable transmittance element according to claim 1, wherein a film thickness of the transparent electrode layer is located between 10 nm and 300 nm.

7. The variable transmittance element according to claim 1, further comprising a second dielectric layer located between the electrochromic layer and one of the two transparent electrode layers closest to the electrochromic layer and configured to reduce reflections, a refractive index difference for the wavelength of 550 nm being 0.3 or more between the electrochromic layer and the transparent electrode layer.

8. The variable transmittance element according to claim 7, wherein a refractive index of the second dielectric layer for the wavelength of 550 nm is located between refractive indexes for the wavelength of 550 nm of both sides of the second dielectric layer.

9. The variable transmittance element according to claim 7, wherein the second dielectric layer is made of a conductive material.

10. The variable transmittance element according to claim 9, wherein the second dielectric layer satisfies the following expression:

$$0 < \Sigma_i \rho_i d_i \leq 100 \, \Omega cm^2$$

where $\rho_i$ is electric resistivity [Ωcm] of an i-th second dielectric layer between the transparent electrode layers, and $d_i$ is a film thickness [cm] of an i-th antireflective layer between the transparent electrode layers.

11. The variable transmittance element according to claim 7, wherein the second dielectric layer is a single layer.

12. The variable transmittance element according to claim 7, wherein the second dielectric layer is made of the same composition as that of the electrochromic layer.

13. The variable transmittance element according to claim 7, wherein the following expression is satisfied:

$$1/6 < nd/\lambda_0 < 1/3$$

where n is a refractive index for a wavelength $\lambda_0$, d is a film thickness of the second dielectric layer, and $\lambda_0$ is 550 nm.

14. The variable transmittance element according to claim 7, wherein each of the electrochromic layer and the second dielectric layer is made of titanium oxide.

15. The variable transmittance element according to claim 1, further comprising:
    an electrolyte layer that is transparent in a visible range and held between the two transparent electrode layers; and
    a second dielectric layer located between the electrochromic layer and the electrolyte layer and configured to reduce reflections.

16. The variable transmittance element according to claim 1, wherein the electrochromic layer is made of an organic material, which contains an electrochromic site having an electrochromic characteristic and an aromatic ring that is directly combined with the electrochromic site, and wherein the electrochromic site forms one conjugate plane, and an atom of the aromatic ring which neighbors an atom united with the electrochromic site may have a substituent having a volume equal to or larger than a methyl group.

17. The variable transmittance element according to claim 1, wherein transmittance of the variable transmittance element in a decolored state satisfies the following expression:

$$0.9 < T(\lambda_v \pm 20\text{ nm})/T(\lambda_v) < 1.1$$

where $T(\lambda_v)$ denotes the transmittance of the variable transmittance element for a wavelength $\lambda_v$, and $\lambda_v$ is an arbitrary wavelength contained in a visible wavelength band between 420 and 680 nm.

18. The variable transmittance element according to claim 1, wherein the variable transmittance element has reflectance of 5% or less in a decolored state in a whole visible range and satisfy the following expression:

$$0.5 < R(\lambda_v \pm 20\text{ nm})/R(\lambda_v) < 2.0$$

where $R(\lambda_v)$ is the reflectance of the variable transmittance element for a wavelength $\lambda_v$, and $\lambda_v$ is an arbitrary wavelength contained in a visible wavelength band between 420 and 680 nm.

19. An optical system comprising a variable transmittance element according to claim 1.

20. An optical apparatus comprising an optical system according to claim 19.

* * * * *